United States Patent
Ratliff

(10) Patent No.: US 11,950,570 B1
(45) Date of Patent: Apr. 9, 2024

(54) PET GROOMING LOOP ACCESSORY

(71) Applicant: Troy Ratliff, Owensboro, KY (US)

(72) Inventor: Troy Ratliff, Owensboro, KY (US)

( * ) Notice: Subject to any disclaimer, the term of this patent is extended or adjusted under 35 U.S.C. 154(b) by 103 days.

(21) Appl. No.: 17/717,973

(22) Filed: Apr. 11, 2022

Related U.S. Application Data

(60) Provisional application No. 63/174,492, filed on Apr. 13, 2021.

(51) Int. Cl.
A01K 27/00 (2006.01)

(52) U.S. Cl.
CPC .......... A01K 27/003 (2013.01); A01K 27/005 (2013.01)

(58) Field of Classification Search
CPC .... A01K 27/003; A01K 27/00; A01K 27/005; F16B 45/04; Y10T 24/4544
See application file for complete search history.

(56) References Cited

U.S. PATENT DOCUMENTS

| | | | |
|---|---|---|---|
| 4,828,210 A | 5/1989 | Anderson et al. | |
| 5,005,527 A * | 4/1991 | Hatfield | A01K 27/005 |
| | | | 119/793 |
| 6,460,488 B1 | 10/2002 | Manzella et al. | |
| 6,662,753 B1 | 12/2003 | Spor | |
| 6,827,045 B1 * | 12/2004 | Willner | A01K 27/003 |
| | | | 119/795 |
| 8,267,050 B1 * | 9/2012 | Hatcher | A01K 27/004 |
| | | | 119/797 |
| 8,281,748 B2 | 10/2012 | Elkins et al. | |
| 8,365,685 B2 * | 2/2013 | Simons | A01K 13/00 |
| | | | 119/856 |
| 8,925,496 B2 * | 1/2015 | Simons | A01K 13/00 |
| | | | 119/856 |
| 9,538,723 B2 | 1/2017 | Simons | |
| 10,398,132 B2 | 9/2019 | Louro | |
| 10,701,903 B1 | 7/2020 | Cesta | |
| 10,757,920 B2 | 9/2020 | Flippen | |
| 2006/0032461 A1 * | 2/2006 | Sporn | A01K 27/003 |
| | | | 119/797 |
| 2016/0135430 A1 | 5/2016 | Noonan | |
| 2017/0118954 A1 | 5/2017 | Hickman et al. | |
| 2017/0181405 A1 | 6/2017 | Tower | |
| 2018/0374395 A1 * | 12/2018 | Johnston | A01K 27/003 |
| 2019/0230898 A1 | 8/2019 | Cassell | |
| 2019/0320618 A1 * | 10/2019 | Simons | A01K 27/003 |
| 2020/0296034 A1 | 9/2020 | Cesta | |
| 2021/0307296 A1 | 10/2021 | Lui | |

* cited by examiner

Primary Examiner — Kristen C Hayes
(74) Attorney, Agent, or Firm — Law Office of J. L. Simunic; Joan Simunic

(57) ABSTRACT

The development is a pet grooming loop that includes a hook and at least one slide. The hook has been modified to allow for single-handed control of the lever and is further adapted so different types of loop materials may be used with a single hook. The slide has an easy latch mechanism so that it can be closed and opened with one hand.

15 Claims, 7 Drawing Sheets

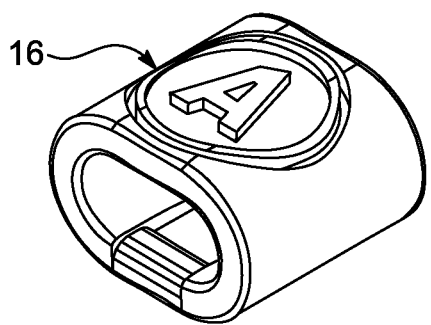
FIG. 8A
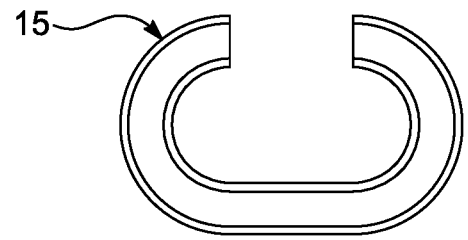
FIG. 8B
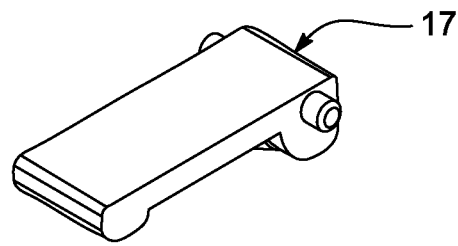
FIG. 8C
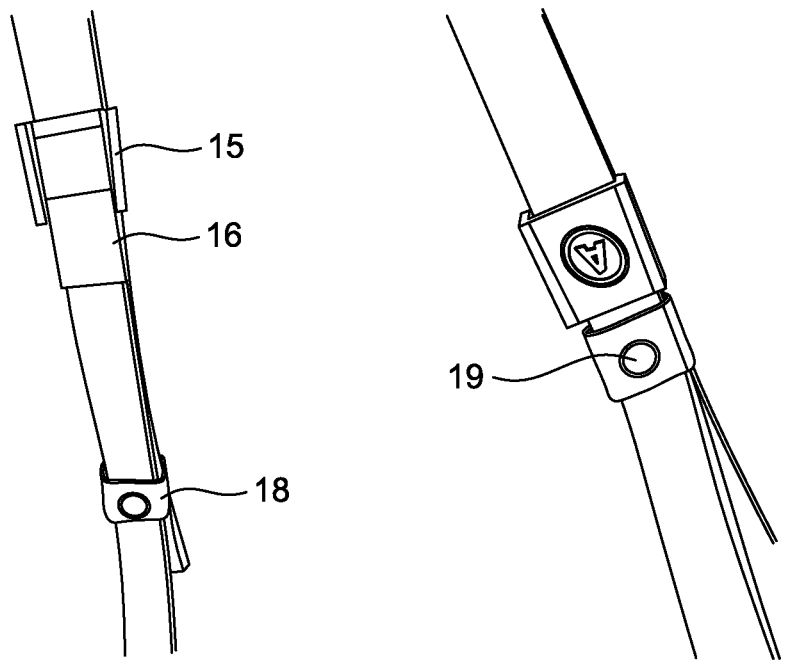
FIG. 9
FIG. 10

PET GROOMING LOOP ACCESSORY

CROSS-REFERENCE TO PRIOR APPLICATIONS

The present application claims priority to U.S. 63/174,492 filed 13 Apr. 2021, which is incorporated herein in its entirety by reference.

GOVERNMENT INTEREST

The invention was made without government support.

FIELD OF THE INVENTION

The invention relates generally to the field of pet restraint devices.

BACKGROUND OF THE INVENTION

In order to maintain control over a pet, such as a dog or cat, during the grooming process, it is common to use secure the pet with a grooming loop. A grooming loop differs from a common leash by including a loop at one end that is secured around the pet being groomed and a hook at an opposing end to allow a groomer to secure the grooming loop and pet to a grooming table or similar work station. In addition, the grooming loop may include one or more slides to allow the groomer to adjust the size of the loop to better fit the pet being groomed.

For the safety of the pet, it is common for the groomer to have one hand on the pet at essentially all times. The groomer then uses his or her free hand to secure or release the hook and to adjust the slides. However, most hooks and slides require two hands for operation, thereby requiring the groomer to risk the safety of the pet while securing or releasing the hook or when adjusting the slide. Thus, a grooming loop with a single-hand hook operation would be beneficial to groomers. In addition, it would be beneficial if the grooming loop included a cam lock and/or a slider that were adjustable using a single hand.

SUMMARY OF THE PRESENT INVENTION

The present development is a pet grooming loop, such as used for restraining dogs or cats during grooming, having a bolt snap designed to allow for single-handed control. The grooming loop with the bolt snap comprises a strap, a bolt snap, at least one cam lock and at least one slider. The single-handed control bolt snap allows the user to open the bolt snap with one hand while leaving a second hand free. In a preferred embodiment, the bolt snap is secured onto the loop by a locking pin unit that allows the loop material to slip within an eye of the bolt snap. The eye can be opened so that different types of loop materials may be used. The cam lock has an easy latch so that it can be closed and opened with one hand. The slider includes at least one nub to allow the slide to be easily moved with one hand, even when the hand is wet or slippery.

BRIEF DESCRIPTION OF THE FIGURES

FIGS. 6A-6C show a prospective view of a first alternative embodiment of the cam lock of FIG. 7A, wherein FIG. 6A shows the cam lock partially open, FIG. 6B shows the cam lock fully open, and FIG. 6 C shows the cam lock closed;

FIG. 8A shows a prospective view of a second alternative embodiment of the cam lock of FIG. 7A wherein the cam lock is fully assembled and closed;

FIG. 8B shows the saddle of the cam lock of FIG. 8A;

FIG. 8C shows the lever of the cam lock of FIG. 8A;

FIG. 9 shows the strap of FIG. 1 with the cam lock of FIG. 7A and the slider attached;

FIG. 10 shows the strap, cam lock and slider of FIG. 9 with the cam lock moved toward the slider;

DETAILED DESCRIPTION OF THE PRESENT DEVELOPMENT

Figure 1:
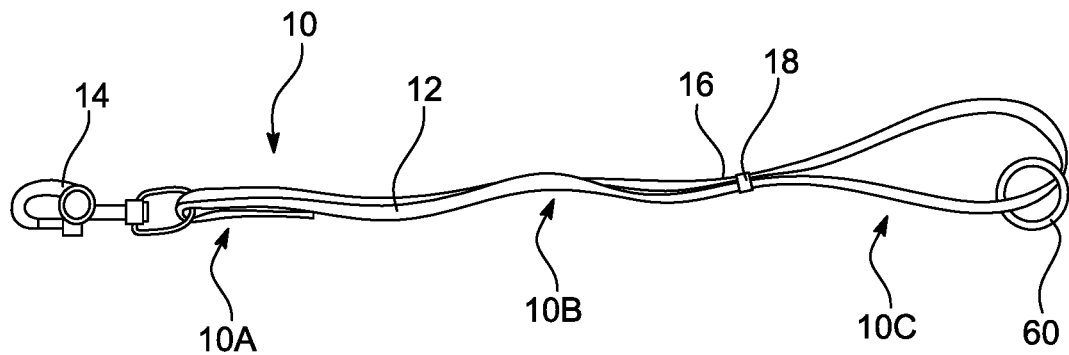
FIG. 1 is a prospective view of the grooming loop of the present invention comprising a strap, a bolt snap, a cam lock, and a slider.
Figure 2:
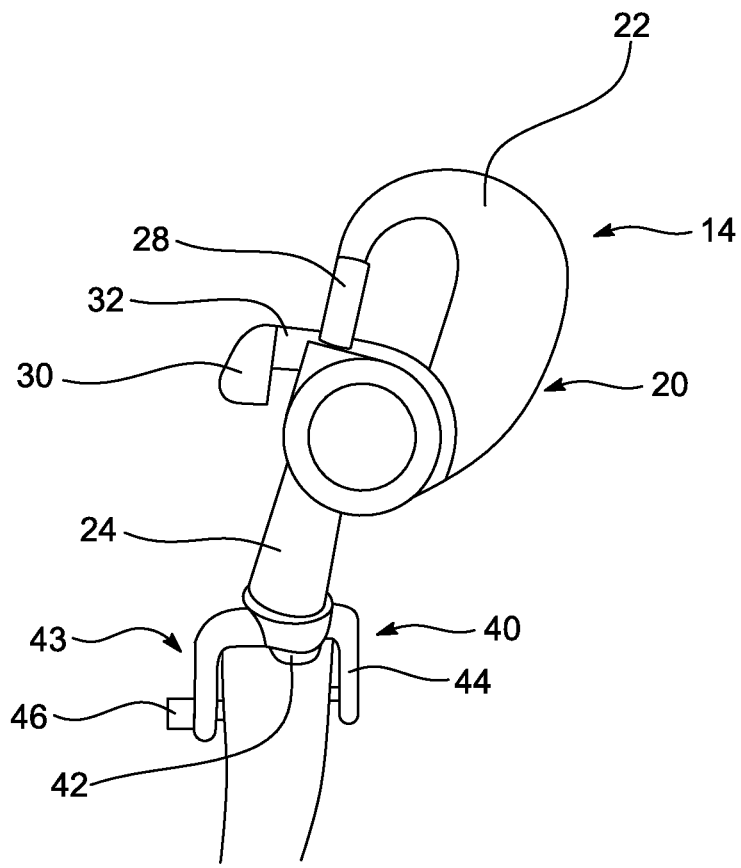
FIG. 2 is a side view of the bolt snap of FIG. 1.

The present development is a pet grooming loop, such as used for restraining dogs or cats during grooming. As shown in FIG. 1, the grooming loop 10 comprises a strap 12, a bolt snap 14, at least one cam lock 16, and at least one slider 18. As shown in FIG. 1, the bolt snap 14 is on a latching end 10A of the grooming loop 10; the cam lock 16 and slider 18 are along the body 106 of the grooming loop 10; and, a collar loop 10C is formed by the slider 18.

Figure 5:
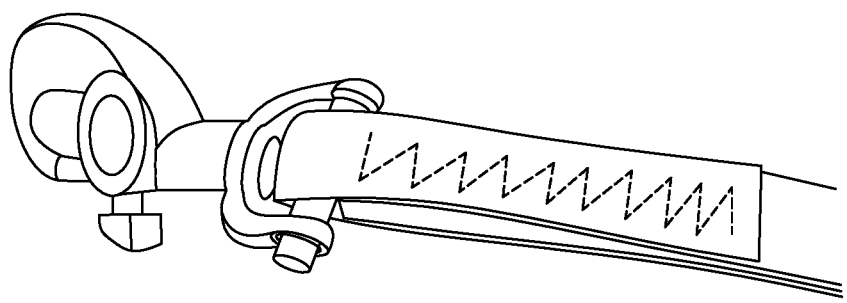
FIG. 5 shows an optional stitching pattern for securing the ends of the strap of the grooming loop of FIG. 1.

The strap 12, which may also be referred to herein as a rope or cord, may be any material normally used for pet leases. Typically the strap material is webbed, but that is not required for the present application. Example materials include nylon, leather, Biothane®, polyester, rubber, jute, polypropylene, cotton, and combinations thereof. Optionally, the strap materials may be coated, such as with polyvinyl chloride, thermoplastic polyurethane and combinations thereof. Optionally, the strap 12 may be finished with a top strap or zig-zag stitching or a combination thereof, as shown in FIG. 5.

Figure 3:
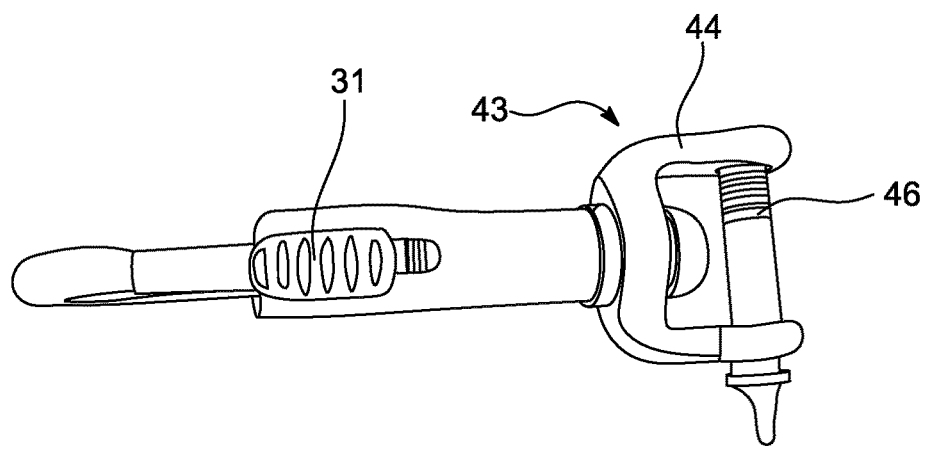
FIG. 3 is a front view of the bolt snap of FIG. 1.
Figure 4A:
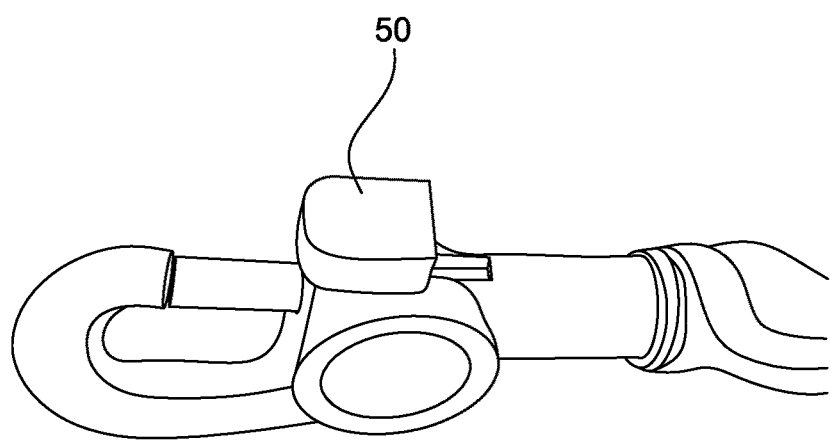
FIG. 4A shows a prospective view of the button cover as used on the bolt snap of FIG. 1.
Figure 4B:
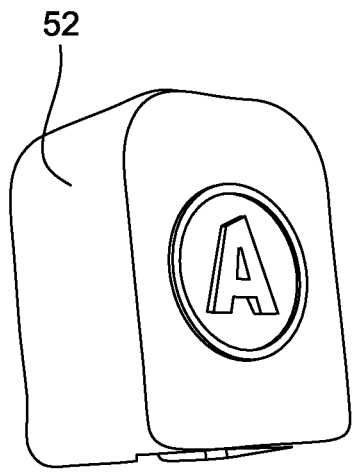
FIG. 4B is side prospective view of the button cover of FIG. 4A.
Figure 4C:
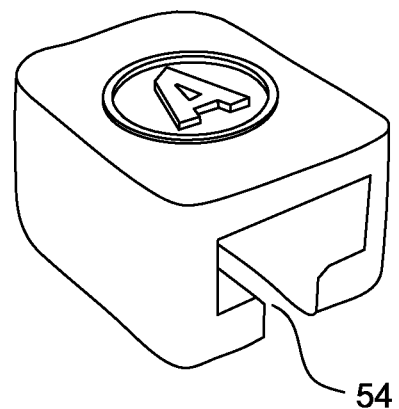
FIG. 4C is a bottom prospective view of the button cover of FIG. 4A.

Referring to FIGS. 2-5, the bolt snap or snap hook 14 comprises a latch 20 and an eye 40. As is known in the art, the latch 20 comprises a hook 22, a shaft 24, a spring 26 (not shown, located within the shaft 24), a bolt 28 and button 30. In the present invention, the button 30 includes an extender 32 located between the bolt 28 and the button 30. The extender 32 is essentially perpendicular to the bolt 28, i.e. a 90° angle is formed between the bolt 28 and the top of the extender 32. The angle of the extender 32 relative to the bolt 28 and the extra space created between the bolt 28 and button 30 makes it easier for a groomer to open the latch 20 because the bolt 28 can be moved away from the hook 22 either by depressing the button 30 or by depressing the extender 32. Not to be bound by theory, it is believed that the design of the extender 32 provides a greater surface area for the groomer's thumb than is provided by the button 30 alone and the angle of the extender 32 relative to the bolt 28 reduces the risk of the thumb slipping off the extender 32 while opening the latch 22. Optionally, as shown in FIG. 3, the button 30 may include ridges 31. The ridges 31 further aid the groomer in securing his or her thumb on the button 30 to move it. Optionally, as shown in FIGS. 4A-4C, the button 30 may be covered with a button cover 50. The button cover 50 is comprises a cap 52 with an open slot 54. The cap 52 is preferrably proportioned to cover the button 30 and the slot 54 allows the button cover 50 to fit over the extender 32. In a preferred embodiment, the button cover 50 is made from a non-slip polymer material to allow the groomer a more secure grip to operate the button 30.

As is known in the art, the eye 40 can be attached to the shaft 24 in a fixed position or in a manner to allow the eye to swivel or rotate. In a preferred embodiment, the eye 40 is attached with a flanged pin 42 to allow the eye to swivel. The prior art teaches an eye that is a closed loop so that the strap 12 must be threaded through the eye with a free end. In the present invention, the eye 40 comprises a snap-and-locking pin unit 43, i.e. a frame 44 adapted to accept a pin 46, as shown in FIG. 3. In the present invention, the pin 46 may be attached to the frame 44 or the pin 46 may be provided as a piece separate from the frame 44.

The bolt snap 14 may be made from any material normally used for pet leases. Example materials include nickel, brass, stainless steel, zinc, iron, performance plastic, metal alloys and combinations thereof. In a preferred embodiment, the bolt snap 14 is made of nickel.

Figure 6A:
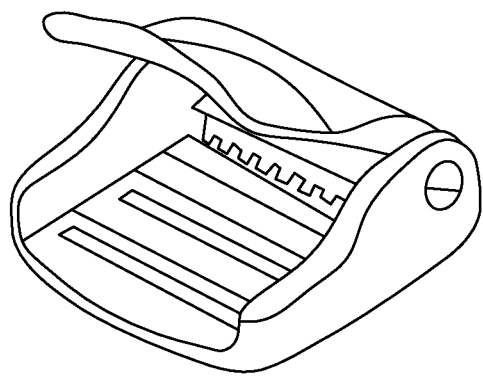
Figure 6B:
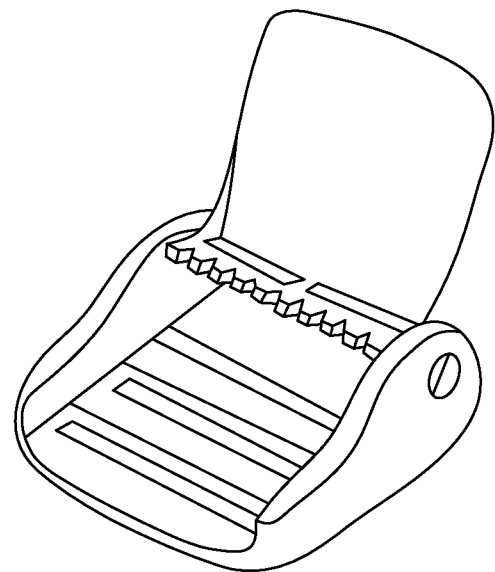
Figure 6C:
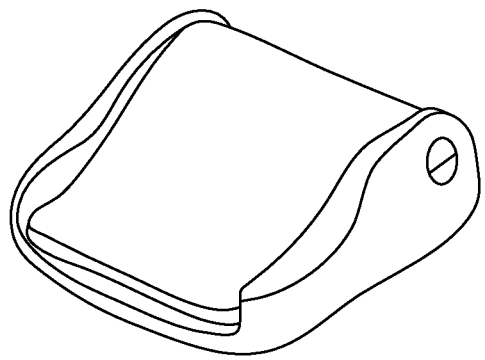
Figure 7A:
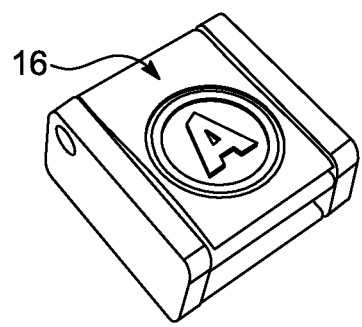
FIG. 7A shows a prospective view of the cam lock of FIG. 1 wherein the cam lock is fully assembled and closed.
Figure 7B:
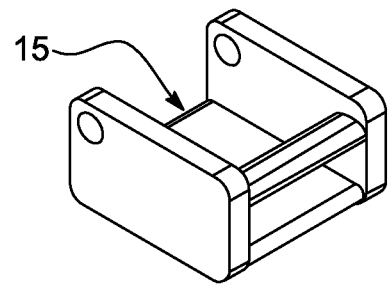
FIG. 7B shows the saddle of the cam lock of FIG. 7A.
Figure 7C:
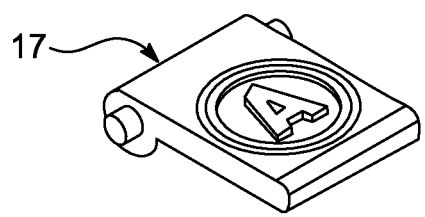
FIG. 7C shows the lever of the cam lock of FIG. 7A.

The cam lock or cam clip 16 can move along the strap 12 between the bolt snap 14 and the slider 18 when the cam lock is in an open position, as is known in the art. When in the closed position, the cam lock 16 prevents the slider 18 from moving and allowing the collar loop 10C to become lax which can allow the animal being groomed to get free from the grooming loop 10. The cam lock 16 may be a commercially-available cam lock or cam buckle, such as shown in FIG. 6. In a first exemplary embodiment, the cam lock 16 has the structure shown in FIG. 7A, and comprises a saddle 15, as shown in FIG. 7B, and a lever 17, as shown in FIG. 7C. In a second exemplary embodiment, the cam lock 16 has the structure shown in FIG. 8A, and comprises a saddle 15, as shown in FIG. 8B, and a lever 17, as shown in FIG. 8C.

The slider 18 adjusts the slack in the leash and adjusts the collar loop 10C size to ensure that the animal being groomed is secured but not struggling to breathe. Numerous slides are commercially available and any may be used in the present invention to adjust the loop size. Alternatively, and preferably, the slider 18 will be the inventive slider shown in FIGS. 9-10, which includes at least one nub 19 on the face of the slider to allow the slider to be easily moved even when the groomer's hands are wet. The slider 18 can be made from any material normally used for pet leases, such as nickel, brass, stainless steel, zinc, iron, performance plastic, metal alloys and combinations thereof. In a preferred embodiment, the slider 18 is made from stainless steel.

For the purposes of example only and not to limit the scope of the present invention, an exemplary grooming loop 10 of the present invention can be prepared by the following steps:

a) obtain a length of strap 12, wherein the strap length is at least 2 times the desired length of the finished grooming loop 10;
b) bring the opposing ends of the strap together and fold the strap in half;
c) slip the slider 18 onto the onto the folded strap so that two thicknesses of strap are within the slider 18;
d) slip the cam lock 16 onto the folded strap so that two thicknesses of strap are within the cam lock 16;
e) cover the strap ends with a top strap, positioning the top strap so as to leave a small gap between the top strap and the ends of the strap 12;
f) remove the pin 46 from the eye 40 of the bolt snap 14;
g) position the frame 44 of the eye 40 of the bolt snap 14 over the top strap such that the pin 46 can pass through the small gap when the pin is engaged with the frame 44;
h) secure the pin 46 to one side of the frame 44, then pass the pin 46 through the small gap, and secure the pin 46 to the opposing side of the frame 46.

Figure 11:
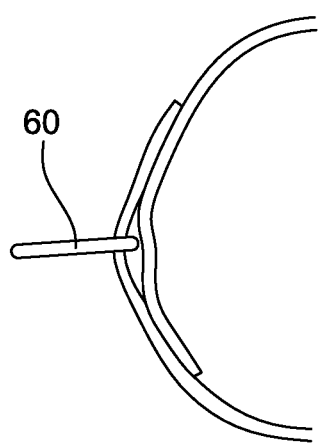
FIG. 11 shows the O-ring of FIG. 1 attached to the strap with a second layer of strap.
Figure 12:
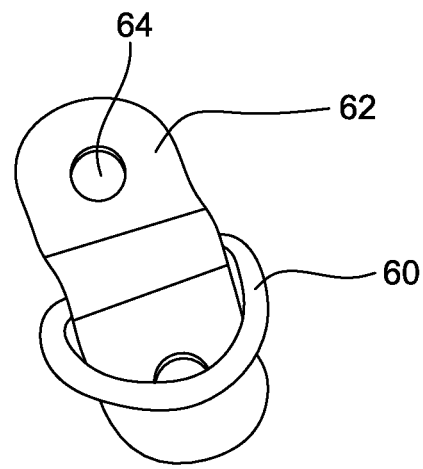
FIG. 12 shows a first alternative embodiment for securing the O-ring of FIG. 1 to the strap; and, FIG. 13 shows a first alternative embodiment of the grooming loop of FIG. 1 with a quick release buckle added to the strap.

As is known in the art, grooming loops 10 commonly include O-rings to provide the groomer flexibility for attachments. As shown in FIG. 1, the O-ring 60 can be loosely attached to the strap 12. In a first exemplary embodiment, as shown in FIG. 11, the O-ring 60 may be secured between two layers of strap 12 to constrain the movement of the O-ring to a limited area. The two layers of strap 12 may be formed by crossing one end of a strap length over a second end of a strap length, as shown in FIG. 11, or by securing a separate piece of strap to the strap 12 (not shown). In a second exemplary embodiment, as shown in FIG. 12, the O-ring 60 may be held in a specific position on the strap 12 using a retaining plate 62. Optionally, apertures 64 may be included in the retaining plate 62 to allow for adding securing means, such as brads, to affix the retaining plate 62 to the strap 12.

Figure 13:
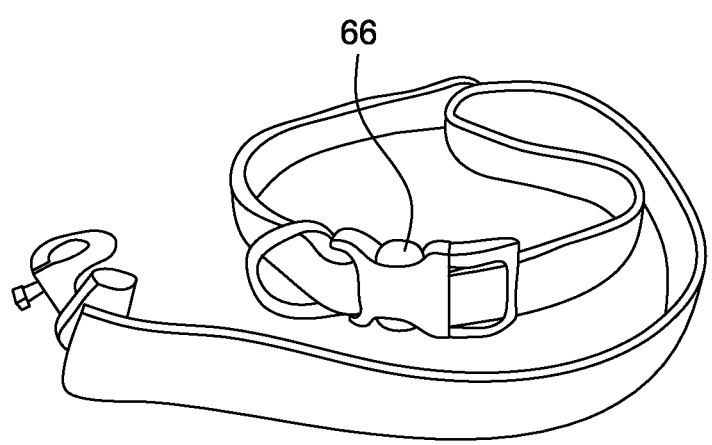

FIG. 13 shows a first alternative embodiment of the grooming loop of FIG. 1 with an optional release buckle 66 added to the strap 12. The release buckle 66 provides a safety feature to allow for quick separation of the strap 12 to minimize the risk of an animal's neck being entangled within a too-tight loop. To be most effective, the release buckle 66 should be positioned within the portion of the grooming loop that forms the collar loop 10C.

The grooming loop 10 is designed to allow for single-handed control of the bolt snap 14 and the cam lock 16 and the slider 18 thereby allowing the groomer to have a hand available to secure the animal being groomed. To achieve this, the grooming loop 10 uses a novel bolt snap 14 and a novel slider 18.

Unless defined otherwise, all technical and scientific terms used herein have the same meaning as commonly understood by one of ordinary skill in the art to which the presently disclosed subject matter pertains. Representative methods, devices, and materials are described herein, but are not intended to be limiting unless so noted.

The terms "a", "an", and "the" refer to "one or more" when used in the subject specification, including the claims. The term "at least one" means that one or more when used in the subject specification, including the claims.

It is understood that, in light of a reading of the foregoing description, those with ordinary skill in the art will be able to make changes and modifications to the present invention without departing from the spirit or scope of the invention, as defined herein. For example, those skilled in the art may substitute materials supplied by different manufacturers than specified herein without altering the scope of the present invention.

What is claimed is:

1. A grooming loop comprising a strap, a bolt snap, at least one cam lock, and at least one slider, wherein the strap defines a first end and a second end, and wherein the strap's first end and second end pass through the slider so that a double thickness of strap is positioned within the slider and a loop is formed, and wherein the strap's first end and second end pass through the cam lock so that a double thickness of strap is positioned within the cam lock and the cam lock is located between the strap's ends and the slider, and wherein the strap's first end passes through an eye of the bolt snap, and the strap's first end is attached to the strap's second end.

2. The grooming loop of claim 1 wherein the bolt snap comprises a frame and a pin, wherein the frame is adapted to accept the pin, and wherein the pin is attached to the frame.

3. The grooming loop of claim 2 further including a button cover comprising a cap with an open slot, and wherein the button cover is proportioned to cover the button and the slot allows the button cover to fit over the extender.

4. The grooming loop of claim 1 wherein the bolt snap comprises a frame and a pin, wherein the frame is adapted to accept the pin, and wherein the pin and the frame are provided as two separate pieces.

5. The grooming loop of claim 1 wherein the strap comprises a material selected from webbed material, nylon, leather, Biothane®, polyester, rubber, jute, polypropylene, cotton, or a combination thereof.

6. The grooming loop of claim 5 wherein the strap material is coated with polyvinyl chloride, thermoplastic polyurethane, or a combination thereof.

7. The grooming loop of claim 1 wherein the bolt snap comprises a latch, and wherein the latch comprises a button that includes an extender that is essentially perpendicular to a bolt.

8. The grooming loop of claim 7 wherein the button further includes ridges on the surface of the button.

9. The grooming loop of claim 1 further including an O-ring attached to the strap.

10. A grooming loop comprising a strap, a bolt snap, at least one cam lock, at least one slider, and a button cover, wherein the bolt snap comprises a latch and a bolt and wherein the latch comprises a button with an extender that is essentially perpendicular to the bolt, and wherein the bolt snap is secured to the strap at a first end and wherein a collar loop is formed from the grooming loop by the slider at a second end and wherein the cam lock is positioned on the strap between the bolt snap and the slider, and wherein the button cover comprises a cap with an open slot and the button cover is proportioned to cover the button and the slot allows the button cover to fit over the extender, and wherein the bolt snap, the cam lock and the slider are each adjustable using a single hand.

11. The grooming loop of claim 10 wherein the button cover is made from a non-slip polymer material.

12. A grooming loop comprising a strap, a bolt snap, at least one cam lock, at least one slider, and at least one release buckle, wherein the strap defines a first end and a second end, and wherein the strap's first end and second end pass through the slider so that a double thickness of strap is positioned within the slider and a collar loop is formed, and wherein the strap's first end and second end pass through the cam lock so that a double thickness of strap is positioned within the cam lock and the cam lock is located between the strap's ends and the slider, and wherein the strap's first end passes through an eye of the bolt snap, and the strap's first end is attached to the strap's second end, and wherein the release buckle is positioned within the strap within the collar loop.

13. The grooming loop of claim 12 wherein the strap comprises a material selected from webbed material, nylon, leather, Biothane®, polyester, rubber, jute, polypropylene, cotton, or a combination thereof.

14. The grooming loop of claim 13 wherein the strap material is coated with polyvinyl chloride, thermoplastic polyurethane, or a combination thereof.

15. The grooming loop of claim 12 further including an O-ring wherein the strap passes through the O-ring.

\* \* \* \* \*